United States Patent Office 2,800,179
Patented July 23, 1957

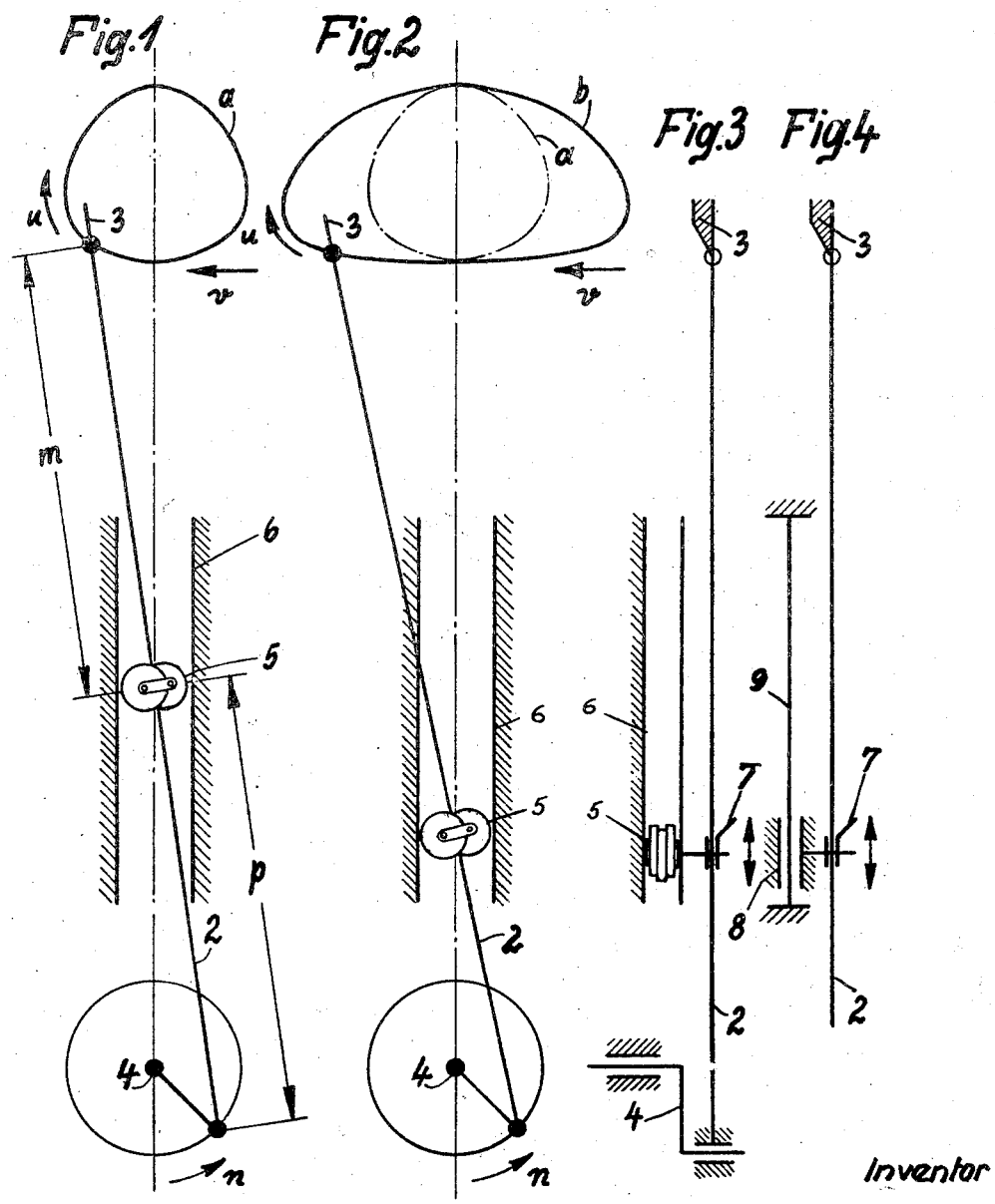

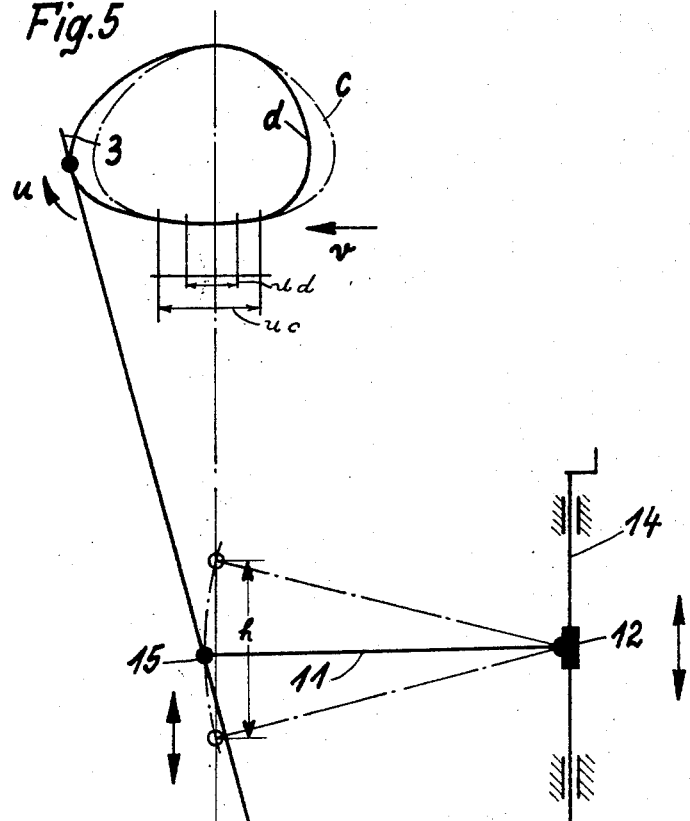
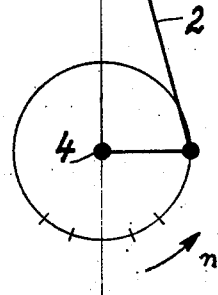
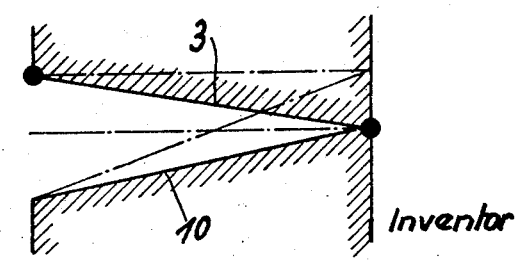

2,800,179

FLYING SHEARS FOR CUTTING A RUNNING BAND OF STEEL OR THE LIKE INTO PORTIONS OF A REQUIRED LENGTH

Kurt Münchbach, Pforzheim, Germany, assignor to Fritz Ungerer, Pforzheim, Germany Application May 10, 1954, Serial No. 428,857

Claims priority, application Germany May 8, 1953

14 Claims. (Cl. 164—47)

This invention relates to flying shears for cutting a running band of material, for instance a steel band, into portions of required length, wherein for the alteration of the length of the portions the speed of the moving cutters can be adjusted to any given speed of the running band.

Constructions of flying shears of this kind in which the cutters of the running band participate in the movement of the latter, and in which the speed of the cutters can be adjusted to the linear speed of the band for preventing the material from buckling and tugging in front of the cutters during the cutting operation, are already known. But known constructions of this kind are expensive and complicated, and frequent trouble is the natural consequence.

That is why existing machines have been constructed in which one of the cutters, preferably the upper one, is actuated by a crank whose rotatable guiding means are adjustable in their position with respect to the crankshaft, and whereby during the process of cutting the portions the guiding means are rotatably locked in position, so that during a rotation of the crank the ratio of rod of the crank changes, and that, when the length of the portions has to be changed, an alteration in the adjustment of the guiding means, particularly an adjustment in height, can be made only when the machine is at rest.

In a construction like this, the speed of the cutter changes considerably during its travel through the cutting area because of the alteration of the length ratio of the rod during a rotation of the crank, so that because of the forces of acceleration and retardation which occur the cutting speeds and consequently also the range of available speeds of the band are rather limited. Considerable strain on the bearings is likewise inevitable.

Contrary to this, the shearing machine according to the present invention achieves with simple constructional means a more uniform rotational speed of the cutters, in this way resulting in an operation at higher cutting speed and consequently also at higher linear speed of the band. The flying shears as disclosed in the present invention are characterized by the feature that one of the cutters, preferably the upper one, is actuated by a crank, particularly an oscillating crank mechanism, provided with guide-way guiding means or rocker arm guiding means which are adjustable with respect to the crankshaft, and wherein the guiding means are, during the cutting, non-shiftably positioned on the connecting rod in such a way that the ratio between the sections of the connecting rod defined by the position of the guide means remains constant during the rotation of the crank, and that the guiding means are, for the purpose of altering the cutting length, adjustable, particularly adjustable in height, when the machine is at rest.

When the cutting length of the material is to be changed, while the traveling speed of the band is to remain the same, first the speed of the crank is changed, which automatically results also in a change of the relation between the cutter speed and the traveling speed of the band. After this, in order to adjust the cutter speed to the traveling speed of the band, the guiding means of the guide-way or the rocker arm guiding means have to be adjusted with respect to the connecting rod, whereby, in conformity with the alteration of the ratio between the sections of rod, the speed of the cutters changes because of the increase or reduction in size of the orbit of the cutters.

In case of guide-way guiding the guiding means, adjustably mounted on the connecting rod in the guide-way, may consist of rollers. In case of rocker arm guiding, that is to say, when an oscillating crank mechanism is employed, an adjustable rocker arm bearing may be arranged at half the height of the oscillation amplitude, whereby, through suitable arrangement of the rocker arm, the additional advantage can be obtained that after the cutting the cutter speed increases because of the alteration of the curved path or orbit of the cutter, which then results in a desirable accelerated separation of the cutters from the cut edge of the band.

The invention further proposes to guide the lower cutter, which is driven by means of an eccentric shaft or crank, along the crank frame of the upper cutter, so that the cutting edges of the cutters are always moving toward each other in the same plane. Special guide rods for the reciprocating motion of the lower cutter are then unnecessary.

It is further possible to provide the upper and lower cutters with slanting cutting edges, which has the effect that the cutting point on the upper cutter moves in the general direction of the band through a flatter curve than is the case with the hitherto customary horizontal cutting edge of the upper cutter. The result is an increase of the area of the equal band and cutter speeds which is essential for satisfactory cutting operation. In addition to this, the use of two slanting cutting edges reduces the cutting pressure.

The actuation of the cutters is preferably effected, for the upper cutter through a crank-shaft, and for the lower cutter through an eccentric or crank shaft coupled to the first crank-shaft by means of gear wheels, whereby the construction may be so devised that gear wheels with various ratios of transmission can be used alternatively in order to make it possible to increase the length of the pieces to be cut through the omission of cuts.

The invention will be best understood from the following description in connection with the accompanying drawing forming a part of this specification and in which several embodiments of the invention are shown by way of illustration. However, I wish to state that the invention is not confined to any details of the drawings, but may be changed or modified without parting from the salient features of the invention as expressed in the appended claims.

In the drawings, in which like parts are referred to by the same reference numerals, Figs. 1 and 2 are diagrammatic illustrations of the upper cutter and its actuating means provided with adjustable guide-way guiding means;

Figs. 3 and 4 are diagrammatic side elevations of guide-way guiding means;

Fig. 5 is a diagrammatic illustration of the upper cutter and its actuating means provided with a rocker-arm guide;

Fig. 6 is a diagrammatic illustration of an upper and lower cutter provided with slanting cutting edges;

Figure 7:
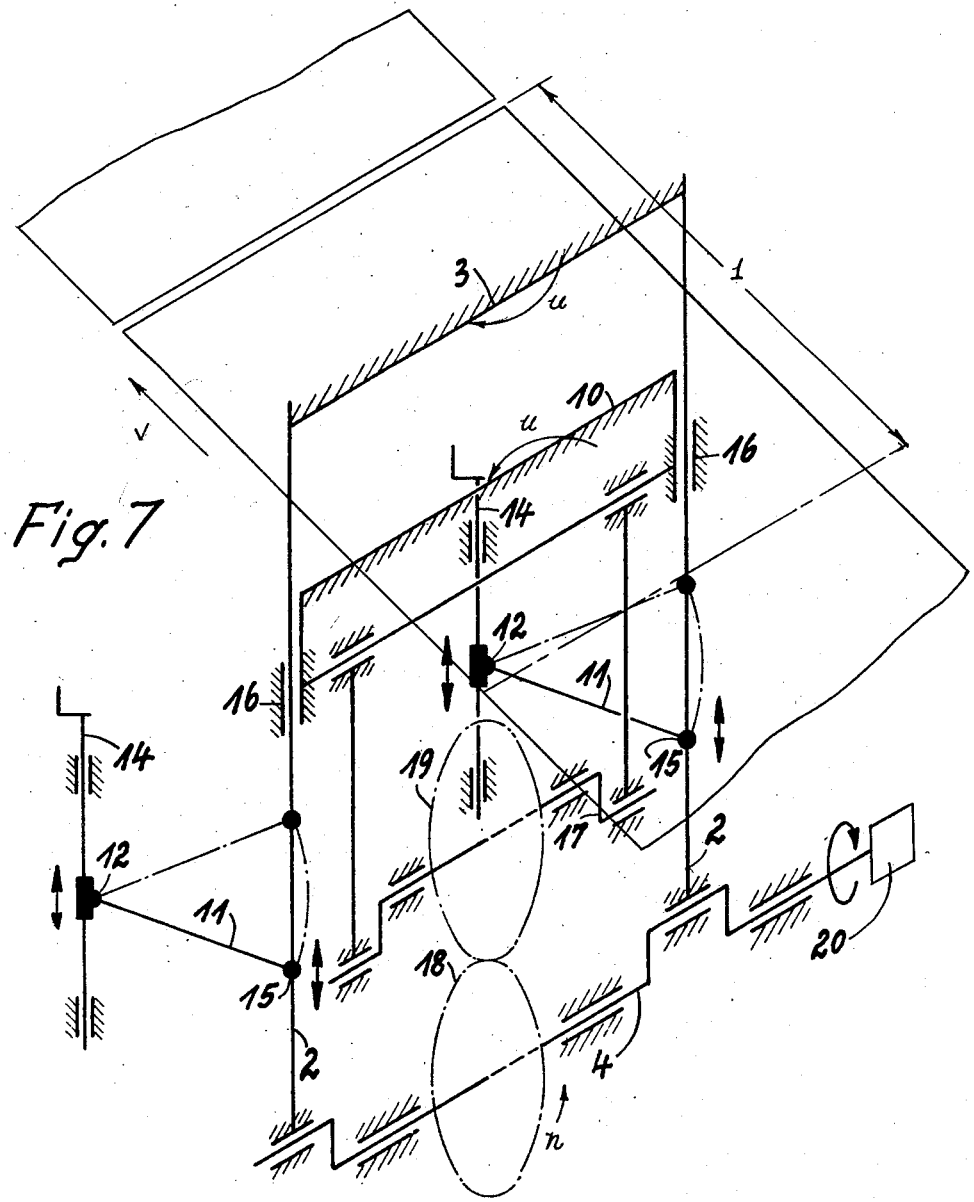
Fig. 7 is a diagrammatic illustration of a shearing machine according to the invention.

Referring now to the drawings in detail, the reference numeral 2 designates the connecting rod which in all embodiments of the present invention carries the upper cutter 3 and which is actuated from the crank-shaft 4. In the first embodiment illustrated in Figs. 1 to 3, the guiding means consist of two rollers 5 which during the cutting operation are rigidly held in a fixed position on the connecting rod 2 and guided in the guide ways 6. Figs. 1 and 2 show the curves, a and b illustrating the path of the cutting edge of the upper cutter 3 at differently adjusted positions of the adjustable guiding means 5 along the rod 2, which are locked in their adjusted positions with the aid of the locking means 7. The modification illustrated in Fig. 4 shows instead of the roller guiding means 5, 6 sliding guiding means 8, 9. Here again the locking means 7 lock the guiding means in their adjusted position.

In shearing machines operating with flying shears for cutting a running band of steel or the like into portions of required length, the cutting is done gradually by means of the inclined cutting edge of the lower cutter 10, as otherwise the cutting power needed for the purpose in question would be too large. The consequence is that a certain time is required to effect the cut, and that in order to avoid bucking and tugging during the cutting, a uniform traveling speed of the band and cutters is necessary.

In the shearing machine of the invention the relation between the required length of the portions and the traveling speed $v$ of the band is established through adjustment of the speed $n$ of the crank 4, while the relation of the co-operative rotary speed $u$ of the cutters to the traveling speed $v$ of the band is established through adjustment of the guiding means 5 or 8 along the connecting rod 2. If, for instance, at a given traveling speed $v$ of the band, the cut length 1 of the portions has to be doubled, it is first necessary to reduce the speed of the crank 4 to ½ $n$, which evidently means that, with the traveling speed $v$ of the band remaining the same, the number of cuts per minute is reduced to one half of the number obtained before, and that therefore the length of the portions is increased to twice of what it was before. As, however, the reduction of the speed of the crank to ½ $n$ also reduces the co-operative speed of the cutters to likewise ½ $u$, it is now necessary to adjust also the co-operative speed $u$ of the cutters in relation to the traveling speed $v$ of the band. If, therefore, the length of rod 2 was formerly divided by the means 5, 8 at a ratio $m:p=1:1$, this ratio must now be adjusted to $m:p=2:1$, which is achieved through adjustment of the guiding means 5 or 8 along the connecting rod 2, whereby the speed $u$ of the cutters is doubled in the cutting area and thereby made equal to the traveling speed $v$ of the band. The result is a corresponding enlargement in width of the curve $a$, $b$ through which the cutting edge has to travel within the time determined by the length of the portions. It will be seen, therefore, that in this way the length of the portions to be cut can be adjusted according to requirements.

In the embodiment of the invention illustrated in Fig. 5, rocker-arm guiding means 11, 12 are substituted for the roller guiding means 5, 6 or sliding guiding means 8, 9. The rocker-arm guiding means 11, 12 have the advantage that they avoid difficulties of lubrication and frictional losses which in guide-way guiding are inevitable particularly at high pressures. The adjustment of the operative position vertically in the example shown, of the rocker-arm guiding means 11, 12 can be effected by means of spindles 14, while the position of the pivotal connection 15 with the connecting rod 2 is shifted accordingly along rod 2. The adjustable bearing 12 of the rocker arm 11 should preferably be arranged at half the height of the oscillation amplitude $h$ as shown in Fig. 5. As in a construction like this the connecting rods 2 are not guided at 15 along a straight line path, but, as shown in dot-and-dash line in Fig. 5, on a circular arc, the curved path of the cutter 3 will change from $d$ to $c$ (see Fig. 5) if the bearing 12 is adjusted downwardly. This, however, results, due to the effect on the swing of the rocker arms 11, in an increase of the cutter speed $u$ after the cutting from $u_d$ to $u_c$, and consequently in a desirable accelerated separation of the cutters from the cut edge of the band, which in the drawing has been clearly shown by lines indicating equal periods of time.

Until now it has been the custom to devise the cutters in such a way that only the cutting edge of the lower cutter 10 extended in a slanting direction, while the cutting edge of the upper cutter 3 extended in horizontal direction as shown in dot-and-dash lines in Fig. 6. When, now, according to the invention, also the edge of the upper cutter 3 is slanting, the actual cutting point moves in the general direction of the band, on a flatter curve, whereby an increase of the area of the equal band and cutter speeds, which is essential for a satisfactory cutting operation, is obtained, and consequently also a lengthening of the common path of band and cutters along which the cutting operation is performed.

As diagrammatically illustrated in Fig. 7, the lower cutter 10 can slide with the aid of guiding means 16 along the frame formed by the connecting rods 2 provided with the adjustable rocker-arm guiding means 11, 12, 14, 15. The actuation of the lower cutter 10, which is moved up and down by means of a crank 17, may preferably be effected through the gear wheels 18, 19 by the crank-shaft 4. For increasing the length of the pieces to be cut to a length determined by multiplying the former with an integer, the construction may be so devised that gear wheels 18, 19 with various ratios of transmission can be used alternatively in order to make it possible in this way to omit cuts according to requirements. The entire actuation of the flying shears, as disclosed in the present invention, is effected by driving means as indicated at 20.

What I claim as new and desire to secure by Letters Patent of the United States is:

1. In a flying shear device for cutting a running band of steel or the like, the improvement comprising flying shear cutter means, connecting rod means operably connected to said cutter means, driving means for actuating said connecting rod means, guide means for said connecting rod means for simultaneously imparting to said connecting rod means, upon actuation of the same by said driving means, longitudinal movement and pivotal movement about a moving axis spaced from said crank means and from the operable connection between said connecting rod means and said cutter means, whereby said cutter means is moved by said connecting rod means along an orbit of predetermined shape into and out of cutting engagement with said band, said driving means being operatively independent of said guide means.

2. A flying shear device for cutting a running band of steel or the like into portions of predetermined lengths comprising, a pair of opposed flying shear cutters, connecting rod means operably connected to one of said cutters, crank means for actuating said connecting rod means, guide means for simultaneously imparting to said connecting rod means, upon actuation of the same by said crank means, longitudinal movement and pivotal movement about an axis which is adapted to move with said connecting rod means and which is spaced from said crank means and from the operable connection between said connecting rod means and said one cutter, whereby said one cutter is moved about an orbit of predetermined shape into and out of cutting engagement with said band, substantially none of the driving force applied to said connecting rod means being applied thereto through said guide means, means for moving the other of said cutters into and out of cutting engagement with said band and said one cutter and means for synchronizing said last mentioned means with the movement of said one cutter.

3. In a flying shear device for cutting a running band of steel or the like, the improvement comprising flying shear cutter means, connecting rod means operatively connected to said cutter means, driving means for actuating said connecting rod means, guide means, pivotally attached to a portion of said connecting rod means which is spaced from said crank means and from the operative connection between said connecting rod means and said one cutter, for simultaneously imparting to said connecting rod means, upon actuation of the same by said driving means, longitudinal movement and pivotal movement about said pivotal attachment, whereby said cutter means is moved along an orbit of predetermined shape into and out of cutting engagement with said band, said driving means being independent of said guide means.

4. The apparatus of claim 3 including means for adjusting the position of said guide means with respect to said driving means.

5. A flying shear device for cutting a running band of steel or the like into portions of predetermined lengths comprising a pair of opposed flying shear cutters, connecting rod means operably connected to one of said cutters, crank means for actuating said connecting rod means, guide means, pivotally attached to a portion of said connecting rod means which is spaced from said crank means and from the operable connection between said connecting rod means and said one cutter, for simultaneously imparting to said connecting rod means upon actuation of the same by said crank means, longitudinal movement and pivotal movement about said pivotal attachment, whereby said one cutter is moved along an orbit of predetermined shape into and out of cutting engagement with said band, said driving means being independent of said guide means, means for moving the other cutter into and out of cutting engagement with said one cutter and said band and means for synchronizing the movement of said last mentioned means with the movement of said one cutter.

6. A flying shear device for cutting a running band of steel or the like into portions of predetermined length, comprising a pair of opposed flying shear cutters, connecting rod means operably connected to one of said cutters, crank means for actuating said connecting rod means, guide means for said connecting rod means for simultaneously imparting to said connecting rod means, upon actuation of the same by said crank means, longitudinal movement and pivotal movement about an axis spaced from said crank means and from the operable connection between said connecting rod means and said one cutter, whereby said one cutter is moved about an orbit of predetermined shape, said guide means comprising guideway follower means pivotally secured to a guide engaging portion of said connecting rod means spaced from said crank means and from the operable connection between said connecting rod means and said one cutter, and guideway means for guiding the movement of said guide-way follower means, and consequently said connecting rod means upon actuation of said connecting rod means by said crank means, means for moving said other cutter into and out of cutting engagement with said one cutter and said band and means for synchronizing said last mentioned means with the movement of said one cutter.

7. The apparatus of claim 6 wherein said guide-way follower means is provided with roller means for rolling along said guide-way means.

8. The apparatus of claim 6 including means for adjustably securing said follower means to said portion of said connecting rod means.

9. A flying shear device for cutting a running band of steel or the like into portions of predetermined length comprising a pair of opposed flying shear cutters, connecting rod means operably connected to one of said cutters, crank means for actuating said connecting rod means, guide means for said connecting rod means for simultaneously imparting to said connecting rod means, upon actuation of the same by said crank means, longitudinal movement and movement about an axis spaced from said crank means and from said operable connection between said connecting rod means and said one cutter, whereby said one cutter is moved along an orbit of predetermined shape, said guide means comprising an arm one end of which is pivotally secured to a guide engaging portion of said connecting rod means spaced from said crank means and from the operable connection between said connecting rod means and said one cutter, the other end of said arm being pivotally mounted on a fixed axis, means for moving said other cutter into and out of cutting engagement with said band and said one cutter and means for synchronizing the said last mentioned means with the movement of said one cutter.

10. The apparatus of claim 9 wherein said other end of said arm is pivotally secured to a bearing which is adjustably mounted on a spindle.

11. The apparatus of claim 5 wherein said means for moving said other cutter includes means driven by said crank means for imparting lateral swinging movement to said other cutter and driving means for moving said other cutter away from and toward said band.

12. The apparatus of claim 11 wherein said means for imparting a cutting movement to said other cutter comprises an eccentric shaft to which said other cutter is coupled for its actuation and wherein said second cutter is slidably mounted on said first connecting rod means between said guide means and the operable connection between said first connecting rod means and said one cutter so as to swing in a lateral direction therewith and wherein said eccentric shaft is synchronized with said first crank means.

13. The apparatus of claim 12 including gear means arranged between said eccentric shaft and the driving shaft of said crank means for driving said eccentric shaft.

14. The apparatus of claim 5 wherein said cutters are provided with slanting cutting edges.

References Cited in the file of this patent

UNITED STATES PATENTS

| | | |
|---|---|---|
| 704,941 | Slick | July 15, 1902 |
| 1,913,153 | Salardi | June 6, 1933 |
| 1,996,617 | Hahn | Apr. 2, 1935 |
| 2,261,007 | Talbot | Oct. 28, 1941 |